US009669850B2

United States Patent
Fuchs et al.

(10) Patent No.: US 9,669,850 B2
(45) Date of Patent: Jun. 6, 2017

(54) METHOD AND SYSTEM FOR MONITORING RAIL OPERATIONS AND TRANSPORT OF COMMODITIES VIA RAIL

(71) Applicant: Genscape Intangible Holding, Inc., Louisville, KY (US)

(72) Inventors: Jason Fuchs, Louisville, KY (US); Deirdre Alphenaar, Prospect, KY (US); Susan Olson, Louisville, KY (US)

(73) Assignee: Genscape Intangible Holding, Inc., Louisville, KY (US)

( * ) Notice: Subject to any disclaimer, the term of this patent is extended or adjusted under 35 U.S.C. 154(b) by 0 days.

(21) Appl. No.: 14/846,095

(22) Filed: Sep. 4, 2015

(65) Prior Publication Data

US 2016/0068173 A1    Mar. 10, 2016

Related U.S. Application Data

(60) Provisional application No. 62/047,605, filed on Sep. 8, 2014.

(51) Int. Cl.
*G08G 1/123* (2006.01)
*B61L 15/00* (2006.01)
(Continued)

(52) U.S. Cl.
CPC .......... *B61L 15/0027* (2013.01); *B61L 25/025* (2013.01); *B61L 25/04* (2013.01)

(58) Field of Classification Search
CPC ..... B61L 15/0027; B61L 25/025; B61L 25/04
(Continued)

(56) References Cited

U.S. PATENT DOCUMENTS

| 4,445,581 A | 5/1984 | Caldicott |
| 4,582,280 A | 4/1986 | Nichols et al. |

(Continued)

FOREIGN PATENT DOCUMENTS

| JP | 05-142020 A | 6/1993 |
| JP | 2011-230722 A | 11/2011 |
| WO | 2011120074 A1 | 10/2011 |

OTHER PUBLICATIONS

Korean Intellectual Property Office, International Search Report issued in corresponding Application No. PCT/US2015/048831, mailed Jan. 26, 2016.

*Primary Examiner* — Kerri McNally
(74) *Attorney, Agent, or Firm* — Stites & Harbison, PLLC; David W. Nagle, Jr.

(57) ABSTRACT

In a method and system for monitoring rail operations and transport of commodities via rail, a monitoring device including a radio receiver is positioned to monitor a rail line and/or trains of interest. The monitoring device including a radio receiver configured to receive radio signals from trains, tracks, or trackside locations in range of the monitoring device. The monitoring device receives radio signals, which are demodulated into a data stream. That data stream is then decoded to find an identification number, which identifies a particular train carrying a commodity. From an analysis of the radio signals and/or identification of the position of the train, information about the train and/or the commodity it is carrying is derived and then reported to an interested party.

9 Claims, 7 Drawing Sheets

(51) Int. Cl.
*B61L 25/02* (2006.01)
*B61L 25/04* (2006.01)

(58) Field of Classification Search
USPC .......................................................... 340/994
See application file for complete search history.

(56) References Cited

U.S. PATENT DOCUMENTS

| | | | | |
|---|---|---|---|---|
| 5,950,966 | A * | 9/1999 | Hungate | B61L 3/125 246/167 R |
| 6,322,025 | B1 * | 11/2001 | Colbert | B61L 15/0027 246/167 R |
| 6,845,953 | B2 * | 1/2005 | Kane | B61L 3/125 246/167 R |
| 7,295,114 | B1 * | 11/2007 | Drzaic | A62B 99/00 235/385 |
| 8,717,434 | B2 | 5/2014 | Alphenaar et al. | |
| 8,842,874 | B1 | 9/2014 | Alphenaar et al. | |
| 2001/0022332 | A1 | 9/2001 | Harland | |
| 2006/0115045 | A1 | 6/2006 | Garfinkle | |
| 2010/0033349 | A1 * | 2/2010 | Tsang | B61L 3/125 340/935 |
| 2012/0051643 | A1 | 3/2012 | Ha et al. | |
| 2013/0062474 | A1 * | 3/2013 | Baldwin | B61L 29/282 246/122 R |
| 2013/0234868 | A1 * | 9/2013 | Koth | G08G 1/127 340/994 |
| 2013/0311014 | A1 * | 11/2013 | Matusiak | B61C 17/12 701/20 |
| 2014/0012439 | A1 * | 1/2014 | Dimmer | B61L 25/025 701/19 |
| 2014/0263862 | A1 * | 9/2014 | Morris | B61L 27/0077 246/2 R |

\* cited by examiner

METHOD AND SYSTEM FOR MONITORING RAIL OPERATIONS AND TRANSPORT OF COMMODITIES VIA RAIL

CROSS-REFERENCE TO RELATED APPLICATIONS

The present application claims priority to U.S. Patent Application Ser. No. 62/047,605 filed on Sep. 8, 2014.

BACKGROUND OF THE INVENTION

The present invention relates to monitoring rail operations and transport of commodities via rail. Such commodities include crude oil, coal, natural gas liquid derivatives or condensates, refined petroleum products, ethanol, biofuels, and other energy commodities, as well as agricultural commodities, including corn and soybeans.

Energy commodities comprise a multi-billion dollar economic market. These commodities are bought and sold by many parties, and as with any traded market, information about the traded commodities is very valuable to market participants. Specifically, information about transportation of these commodities can have significant impacts on the price of these commodities. Furthermore, such information generally is not disclosed publicly, and access to such information is therefore limited.

SUMMARY OF THE INVENTION

The present invention is a method and system for monitoring rail operations and transport of commodities via rail.

In modern rail transport, certain communications and control systems are used for train power management, safety, fault detection, signaling, intra-train and train-to-operator communication, transported commodity tracking, train status reporting, and train track operating status reporting. Devices associated with these communications and control systems are installed on the trains, on the tracks, or at trackside locations. A number of these devices communicate using the radiofrequency spectrum (or emit signals in the radiofrequency spectrum).

In accordance with the method and system of the present invention, one or more monitoring devices are positioned to monitor a rail line of interest. An exemplary monitoring device includes a radio receiver configured to receive signals from one or more of the communications systems associated with a train travelling on the rail line, which signals can be received passively or by actively interrogating devices associated with the one or more of the communications systems.

The exemplary monitoring device further includes a computer (or microprocessor) with a memory component. The radio receiver is operably connected to the computer, and radio signals received by the radio receiver are communicated to the computer, for example, via a microphone jack or similar audio input. Software resident on the computer (and stored in the memory component) then filters and demodulates the signal, outputting a data stream that can then be decoded and analyzed.

The exemplary monitoring device further includes a transceiver for transmitting data and information from the monitoring device to a central processing facility for further analysis and reporting or directly to market participants and other interested parties.

In one exemplary implementation, a single monitoring device (which can be characterized as a node) is positioned in range of a rail line of interest. For instance, the monitoring device may be positioned in range of a loading or unloading terminal for a commodity, such as crude oil or coal. The radio receiver of the monitoring device is configured to receive radio signals within at least one certain frequency range.

Once received by the radio receiver of the monitoring device, a particular radio signal is demodulated. Specifically, software resident on the computer demodulates the radio signal, outputting a data stream. The data stream is decoded to find an identification number, which is unique to a particular transmitting device from which the radio signal is being received. Then, for each data stream collected, there is a set of signal times, each representative of a discrete time that the radio signal containing the data stream was received and identified by the radio receiver of the monitoring device. Where a data stream can be associated with a unique transmitting device on a train, the set of signal receive times can be associated with the times at which a single train was in range of the monitoring device.

In order to associate a group of signal receive times to one particular arrival and departure event of a train at a loading or unloading terminal that is within range of the monitoring device, the signal receive times can be filtered to determine the arrival and departure times for each unique visit of a particular train at the loading or unloading terminal by defining a delay time between consecutive signal receive times, with the delay time being sufficiently long to indicate that the train has left the terminal of interest.

Once a specific data stream is identified as belonging to a unique visit at a terminal, and the arrival and departure times for any given visit of a particular train at the loading or unloading terminal has been determined, the time period that any train stayed at the terminal can be calculated.

Based on such data about arrivals and departures, certain information about the train and the commodity it carries may be derived. Such analysis of the data may be carried out by the computer of the monitoring device, or the data may be transmitted to a central processing facility for such analysis (via the transceiver). For instance, if the monitoring device is positioned in range of a loading or unloading terminal for a commodity, such as crude oil or coal, and the number of cars carrying the commodity can be determined, each recorded visit to the terminal can be associated with a volume of commodity loaded or unloaded.

If the loading and/or unloading rates are known for a given terminal, the time that a particular train stayed at the terminal for a given visit can be correlated to the volume of the commodity loaded onto or unloaded from the train.

Of course, various other information can be derived from the arrival and departure data, including, for example: the rates of arrivals and/or departures over certain time periods; average terminal visit times; and the time of day of arrivals and/or departures.

Regardless of which type of information is sought and derived from the data, the information is communicated to market participants and other interested parties, including, for example, third parties who would not ordinarily have ready access to such information about the commodities. It is contemplated and preferred that such communication to interested parties could be achieved through electronic mail, data file delivery, mobile application delivery, and/or through export of the data to an access-controlled Internet web site, which interested parties can access through a common Internet browser program, such as Google Chrome.

Furthermore, normal activity patterns can be identified from the data and then stored in a database. Thereafter, as subsequent information about the train and/or the commodity is derived, deviations from the normal activity patterns can also be detected, with alerts then being transmitted to market participants and other interested parties to notify them of such deviations from normal activity patterns.

In another exemplary implementation, at least two monitoring devices are positioned in range of a rail line of interest and are designated as a first node ($N_1$) and a second node ($N_2$) in a rail transport network, and the monitoring devices thus can monitor rail transport between the two nodes, $N_1$ and $N_2$. For example, these monitoring devices may be positioned in sequence along a rail line that leads to or from a loading or unloading terminal for a commodity. For another example, these monitoring devices may be positioned at a loading terminal and an associated unloading terminal, where a commodity is loaded at a terminal (at $N_1$) and is transported and subsequently unloaded at a receiving terminal (at $N_2$).

Once a radio signal is received by the radio receiver of one of the monitoring devices, it is again demodulated, and the data stream can be decoded to find an identification number. Now, assuming that the same identification number (which again is unique to a particular transmitting device on a train) is identified at both nodes, $N_1$ and $N_2$, there is a set of signal times, each representative of a discrete time that the radio signal containing the identification number was received and identified by the radio receiver of each of the monitoring devices. With this data, the radio signals can then be placed in sequential order, with a notation as to which node received the radio signal. When there is a change with respect to the node at which the radio signal is received, such a change is representative of a change in positioning of the train, and, in this example, is indicative of a trip between two terminals associated with unloading or loading a commodity. In other words, the signal receive times can be filtered to determine the arrival and departure times for each trip of a particular train from a loading terminal to an unloading terminal or from an unloading terminal to a loading terminal.

Of course, various other information can be also derived from the arrival and departure data, including, for example: the rates of arrivals and/or departures over certain time periods; average travel times between the two nodes; and the time of day of arrivals and/or departures. Again, once certain normal activity patterns are identified, deviations from the normal activity patterns can also be detected, with alerts then being transmitted to market participants and other interested parties to notify them of such deviations from normal activity patterns.

DETAILED DESCRIPTION OF THE INVENTION

Figure 1:
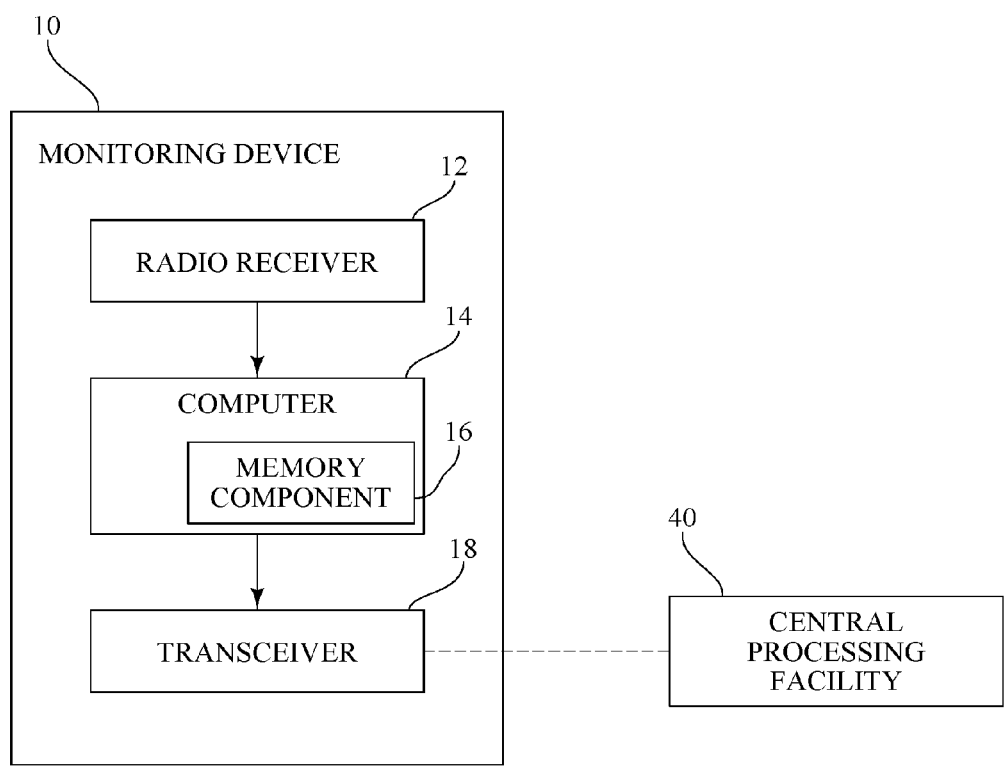
FIG. 1 is a schematic view of an exemplary monitoring device for use in the method and system of the present invention.

The present invention is a method and system for monitoring rail operations and transport of commodities via rail.

In modern rail transport, certain communications and control systems are used for train power management, safety, fault detection, signaling, intra-train and train-to-operator communication, transported commodity tracking, train status reporting, and train track operating status reporting. Devices associated with these communications and control systems are installed on the trains, on the tracks, or at trackside locations. A number of these devices communicate using the radiofrequency spectrum (or emit signals in the radiofrequency spectrum). For instance, with respect to the control of power on the train, each train may have a distributed power system that optimizes the distribution of power and braking control over the length of the train. Such a distributed power system includes a radio communication link between the lead locomotive and the trailing locomotives for transmitting command signals from the lead locomotive to the trailing locomotives and for transmitting data and information back from the trailing locomotives to the lead locomotive. The use of such a radio communication link is described, for example, in U.S. Pat. No. 4,582,280, which is entitled "Radio Communication System" and is incorporated herein by reference. Furthermore, a distributed power system using such a radio communication link is commercially available and marketed, for example, under the registered trademark Locotrol® by General Electric Transportation of Chicago, Ill. (Locotrol® is a registered trademark of GE Transportation Systems Global Signaling, LLC of Grain Valley, Mo.) Radio signals in such distributed power systems are commonly frequency shift key (FSK) modulated, with a typical bit rate of 1200 bps and a carrier frequency of 1500 Hz.

In modern rail transport, to govern the safe operation of the train, systems and protocols are also established for radio communications between the rear car and the locomotive cab. For instance, such an "end-of-train" protocol is described in Standard S-9152 of the Manual of Standards and Recommend Practices Section K-II, "Locomotive Electronics and Train Consist System Architecture," Association of American Railroads Safety and Operation (August 2012). Radio signals in such end-of-train communications systems are also commonly frequency shift key (FSK) modulated, with a typical bit rate of 1200 bps and a carrier frequency of 1500 Hz.

In modern rail transport, to aid in the safe passage of the train on its track and to alert control systems that trains are passing certain sections of track, Advanced Train Control Systems (ATCS) monitor specific sections of track and report as to the locations of trains, i.e., whether a particular section of track is occupied. Such ATCS are also governed by specifications promulgated by the Association of American Railroads and typically involve radio communications between track monitoring locations and trains passing on the tracks. Other protocols include, for example: the Wabtec Advanced Railroad Electronics System (ARES) protocol; the Union Switch and Signal Genisys protocol; and the Safetran Supervisory Control System (SCS-128) protocol.

Such protocols govern how information is transmitted and received between railroad wayside communications devices. Furthermore, software that will demodulate, decode, and display the communications signals is commonly available, including, for example, the "ATCS Monitor" available at http://www.atcsmon.com/.

In modern rail transport, to aid in the safe transit of a train, Positive Train Control (PTC) systems are used to control the operation of a train, with an on-board speed control unit in the train enforcing speed limits and/or reacting to track conditions, such as potential hazards on the track, which are communicated to the on-board speed control unit from radio transponders located along the track. These radio transponders communicate using a protocol governed by specifications promulgated by the Association of American Railroads. For instance, one such PTC protocol is described in the Manual of Standards and Recommend Practices Section K-I, "Railway Electronics Systems Architecture and Concepts of Operation (9000 Series)," Association of American Railroads Safety and Operations (August 2014). One such system employing this PTC protocol is commercially available and marketed under the registered trademark, I-ETMS® (or Interoperable Electronic Train Management System) by Wabtec Railway Electronics, a subsidiary of Wabtec Corporation of Wilmerding, Pa.

In modern rail transport, to aid in inventory tracking, radiofrequency identification (RFID) systems are sometimes used to identify and track railcars, locomotives, end-of-train devices, and other railway equipment. Passive RFID tags containing electronically stored information are placed on railcars and locomotives. RFID readers that emit radiofrequency signals are placed near the track. These readers emit a radiofrequency signal that powers any nearby tags. The signal is also modulated by the tag according to the information stored on the tag, and the modulated information is reflected back to the reader. When a tag passes by the reader, the reader receives the stored information and records this event. The reader may also relay the locational information of the tag to a central server or other networked device. In the rail industry, this system is known as automatic equipment identification (AEI), and this protocol is also governed by specifications promulgated by the Association of American Railroads. For instance, such an AEI protocol is described in Standard S-918 of the Manual of Standards and Recommend Practices Section K, "Standard for Automatic Equipment Identification" Association of American Railroads Safety and Operations (2014). Another example of such an AEI protocol can be found in Standard S-9203 of the Manual of Standards and Recommend Practices Section K-III, "Automatic Equipment Identification," Association of American Railroads Safety and Operations (2014).

These examples illustrate some but not all of the devices relating to train operation which use the radiofrequency spectrum for communication, and as described above, such devices can be installed on the trains, on the tracks, or at trackside locations.

In accordance with the method and system of the present invention, one or more monitoring devices are positioned to monitor a rail line of interest. As shown in FIG. 1, an exemplary monitoring device 10 includes a radio receiver 12 configured to receive signals from one or more of the communications systems associated with a train travelling on the rail line, which signals can be received passively or by actively interrogating devices associated with the one or more of the communications systems. With respect to the distance from the one or more monitoring devices 10 to the rail line, the only relevant consideration is that the radio receiver 12 of each monitoring device 10 must be close enough to receive radio signals from a train travelling on the rail line (or from devices installed on the track or trackside). The possible proximity of the monitoring device 10 thus depends on parameters such as radio transmission power, the frequency of the transmission, the line of sight from the radio transmitter to the radio receiver 12 of the monitoring device 10, atmospheric conditions, and so on. Hence, there is a large range of possible distances that monitoring devices 10 may be deployed relative to the target rail devices. Furthermore, it is also possible that a monitoring device 10 is not at a fixed position, but may be mobile, for example, carried by a drone, satellite, or other vehicle. In any event, one commercially available radio receiver suitable for use in the present invention is a Mobile BearTracker™ BCT15X Scanner manufactured and sold by Uniden American Corporation of Irving, Tex. Such a scanner can receive signals across a broad spectrum of frequencies, including those used in railroad operations.

Referring still to FIG. 1, the exemplary monitoring device 10 further includes a computer 14 (or microprocessor) with a memory component 16. The radio receiver 12 is operably connected to the computer 14, and radio signals received by the radio receiver 12 are communicated to the computer 14, for example, via a microphone jack or similar audio input. Software resident on the computer 14 (and stored in the memory component 16) then filters and demodulates the signal, outputting a data stream that can then be decoded and analyzed, as discussed in further detail below.

Referring still to FIG. 1, the exemplary monitoring device 10 further includes a transceiver 18 for transmitting data and information from the monitoring device 10 to a central processing facility 40 for further analysis and reporting or directly to market participants and other interested parties. In this regard, the transceiver 18 is simply a device to send data, whether via radio communications, satellite communication, cellular communications, the Internet, or otherwise.

Figure 2:
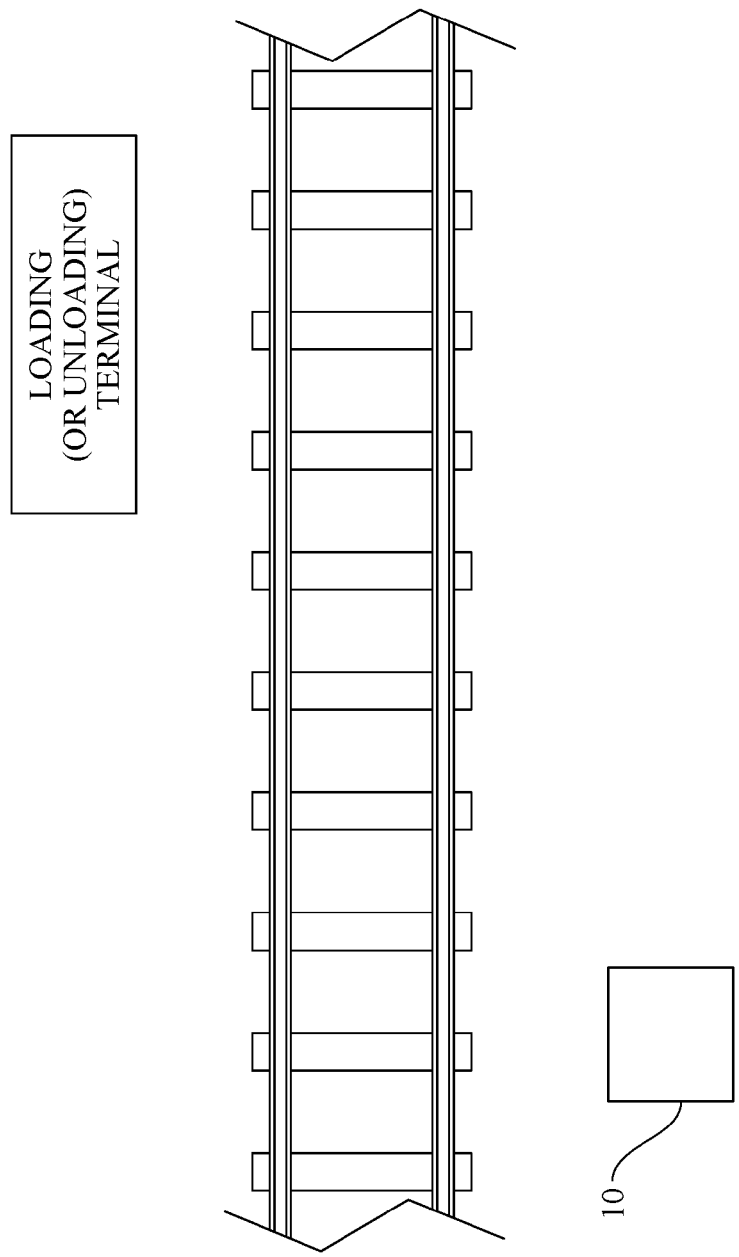
FIG. 2 is a schematic view that illustrates the positioning of a single monitoring device in range of a rail line of interest.

Referring now to FIG. 2, in one exemplary implementation, a single monitoring device 10 (which can be characterized as a node) is positioned in range of a rail line of interest. Again, the only consideration with respect to the distance from the rail line of interest is that the monitoring device 10 must be close enough to receive radio signals from one or more communication systems from a train travelling on the rail line or from devices installed on the track or trackside, whether passively or by actively interrogating such devices. For instance, the monitoring device 10 may be positioned in range of a loading or unloading terminal for a commodity, such as crude oil or coal. The radio receiver 12 of the monitoring device 10 is configured to receive radio signals within at least one certain frequency range. Upon receiving a radio signal of interest, the radio signal is then demodulated, decoded, and analyzed to identify the train that is in range of the monitoring device 10.

Figure 3:
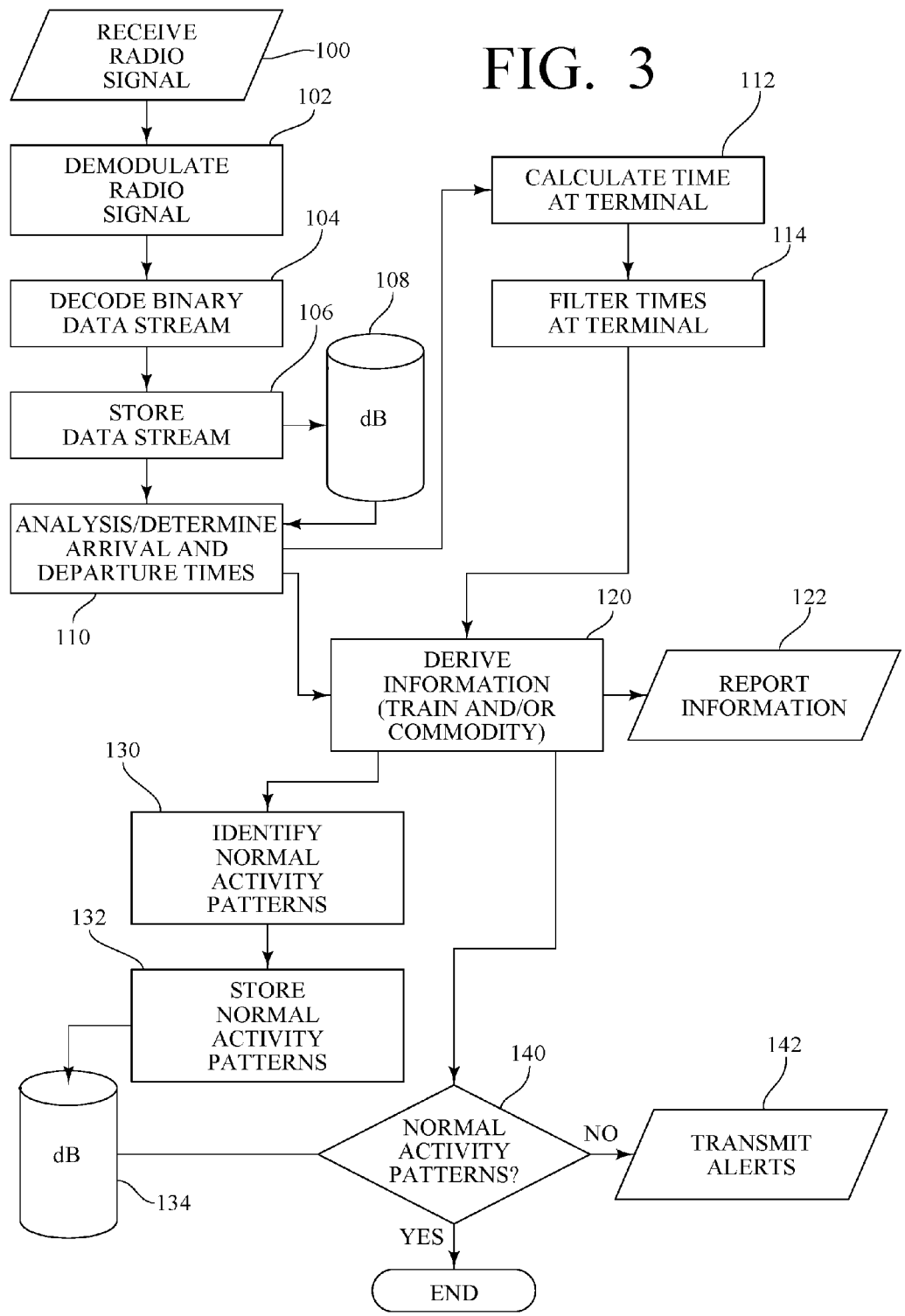
FIG. 3 is a flow chart illustrating an exemplary implementation of the method of the present invention.

Referring now to FIG. 3, in this exemplary implementation, once received by the radio receiver 12 of the monitoring device 10, as indicated by input 100, a particular radio signal is demodulated, as indicated by block 102. Specifically, as discussed above, software resident on the computer 14 demodulates the radio signal, outputting a data stream.

Then, the data stream can be decoded to find an identification number, which is unique to a particular transmitting device from which the radio signal is being received, as indicated by block 104 of FIG. 3.

Such software for demodulating and decoding radio signals is well-known to one of ordinary skill in the art. For example, WiNRADiO Communications of Oakleigh, Australia markets and sells a software product marketed as the "WiNRADiO Universal FSK Decoder" (http://www.winradio.com/home/fskdecoder.htm) that will both demodulate and decode frequency shift key (FSK) modulated radio signals.

Referring still to FIG. 3, the decoded data stream can be stored in a database 108, as indicated by block 106. Such a database can be maintained locally (i.e., resident on the monitoring device 10 in the memory component 16 of the computer 14) and/or remotely (i.e., stored at a central processing facility 40 after transmission by the transceiver 18 of the monitoring device 10).

The position of unique identification number(s) in the data stream is dependent on the format of the data stream and the type of transmitting device. For example, the data may be encoded in the format prescribed in the above-referenced Standard S-9152 of the Manual of Standards and Recommend Practices Section K-11, "Locomotive Electronics and Train Consist System Architecture," Association of American Railroads Safety and Operation (August 2012), where there is a 17-bit data block for the "unit address code."

Then, for each data stream collected, there is a set of signal times, each representative of a discrete time that the radio signal containing the data stream was received and identified by the radio receiver 12 of the monitoring device 10. Where a data stream can be associated with a unique transmitting device on a train, the set of signal receive times can be associated with the times at which a single train was in range of the monitoring device. These signal receive times are represented by:

$$t_0, t_1 \ldots t_n, t_{n+1} \quad (1)$$

For such a set of signal receive times, the difference, $\Delta t_n$, between each individual signal receive time can also be calculated and recorded:

$$\Delta t_n = t_{n+1} - t_n \quad (2)$$

In order to associate a group of signal receive times to one particular arrival and departure event of a train at a loading or unloading terminal that is within range of the monitoring device 10, the signal receive times can be filtered to determine the arrival and departure times for each unique visit, k, of a particular train at the loading or unloading terminal by defining a delay time between consecutive signal receive times, $T_{delay,max}$, where $T_{delay,max}$ represents a predetermined maximum time delay between consecutive signal receive times, such that the delay time is sufficiently long to indicate that the train has left the terminal of interest. Typical inter-signal delay times for given train visits at loading and unloading terminals are dependent on train operations at the terminal and can vary from seconds to hours. A train arrival and departure time for a given visit, k, is then defined as follows (and as indicated by block 110 of FIG. 3):

$$t_{arrival,k+1} = t_{n+1} | \Delta t_n > T_{delay,max} \quad (3)$$

$$t_{departure,k} = t_n | \Delta t_n > T_{delay,max} \quad (4)$$

Once a specific data stream is identified as belonging to a unique visit at a terminal, and the arrival and departure times for any given visit, k, of a particular train at the loading or unloading terminal has been determined, the time period that any train stayed at the terminal, $t_{terminal,k}$, for any given visit, k, can be calculated as follows (and as indicated by block 112 of FIG. 3):

$$t_{terminal,k} = t_{departure,k} - t_{arrival,k} \quad (5)$$

As a further refinement, to identify trains of interest as being trains that visit a terminal for sufficient periods of time, and isolate them from, for example, trains passing or permanently parked in range of the monitoring device 10, minimum and maximum in range times corresponding to defined visit times, $T_{terminal,min}$ and $T_{terminal,max}$, may be chosen, and the data is then filtered as follows (and as indicated by block 114 of FIG. 3):

$$T_{terminal,min} < t_{terminal,k} < T_{terminal,max} \quad (6)$$

In other words, only trains that are in range between the chosen minimum and maximum in range times, $T_{terminal,min}$ and $T_{terminal,max}$, are identified as trains of interest.

Table A is a representative table of data for a single monitoring device 10 positioned in range of a rail line of interest, i.e., the arrangement illustrated in FIG. 2. As shown in Table A, a train is first identified as in range of the monitoring device 10 at $t_0 = 00:00:00$. In this case, $T_{delay,max}$ is set equal to four hours based on historical observations at the terminal of interest. Then, the train remains in range of the monitoring device 10 and signals are received at 10-second intervals labeled as $t_0$, $t_1$, $t_2$ and so on, until the last signal is received from the train at 1:00:00, one hour later. No further train signals are received until seven hours later at 8:00:00. The departure time for the train visit k=1 is set to 1:00:00 since the maximum delay time $T_{delay,max}$ of four hours has passed. The arrival time for the train visit k=2 is set to 8:00:00. Signals continue to be collected during this second visit to the terminal as before.

TABLE A

| Number of Signals Received, n | Signal receive time, $t_n$ (hr:mm:ss) | Inter-signal delay time, $\Delta t_n = t_{n+1} - t_n$ (hr:mm:ss) | Visits at Terminal, k | Arrival/ Departures Times |
|---|---|---|---|---|
| 0 | 00:00:00 | 00:00:10 | 1 | Arrival Time = 00:00:00 |
| 1 | 00:00:10 | 00:00:10 | 1 | |
| 2 | 00:00:20 | 00:00:10 | 1 | |
| 3 | 00:00:30 | 00:00:10 | 1 | |
| ... | ... | ... | ... | ... |
| 359 | 00:59:50 | 00:00:10 | 1 | |
| 360 | 1:00:00 | 7:00:00 | 1 | Departure Time = 1:00:00 |
| 361 | 8:00:00 | 00:00:10 | 2 | Arrival Time = 8:00:00 |
| 362 | 8:00:10 | 00:00:10 | 2 | |
| 363 | 8:00:20 | 00:00:10 | 2 | |
| 364 n | 8:00:30 | 00:00:10 | 2 | |

Based on such data about arrivals and departures, certain information about the train and the commodity it carries may be derived, as indicated by block 120 of FIG. 3. Such analysis of the data may be carried out by the computer 14 of the monitoring device 10, or the data may be transmitted to a central processing facility 40 for such analysis (via the transceiver 18 shown in FIG. 1). For instance, if the monitoring device 10 is positioned in range of a loading or unloading terminal for a commodity, such as crude oil or coal, and the number of cars carrying the commodity can be determined, each recorded visit to the terminal can be associated with a volume of commodity loaded or unloaded, V, as follows (with the assumption being that the train is completely loaded or unloaded while at the terminal):

$$V = V_c \times C_t \quad (7)$$

where $C_t$ is the number of train cars and $V_c$ is the volume capacity of each car.

If the loading and/or unloading rates are known for a given terminal, the time that a particular train stayed at the terminal for a given visit, $t_{terminal,k}$, can be correlated to the volume of the commodity loaded onto or unloaded from the train. For example, for a constant loading or unloading rate, r, for a particular commodity, the volume of the commodity loaded or unloaded, V, is calculated as follows:

$$V = r \times t_{terminal,k} \qquad (8)$$

The time a train is at a terminal may also indicate the type of train loading or unloading a commodity. For example, so-called "manifest" trains are trains where only certain cars carry the commodity to be unloaded, and such manifest trains will typically only stay at a terminal to drop off the specific cars carrying the commodity being unloaded. Thus, manifest trains will have a shorter visit time than so-called "unit" trains, where all the cars carry the commodity being unloaded. The latter train type will stay at the terminal until the entire unloading process is complete, and the unit train will then depart with empty cars.

Furthermore, trains stopping at certain terminals which load or unload only one commodity can be associated with that commodity, and these trains can be tracked as being associated with that commodity when they are detected at other terminals.

Of course, various other information can be derived from the arrival and departure data, including, for example: the rates of arrivals and/or departures over certain time periods; average terminal visit times; and the time of day of arrivals and/or departures.

Regardless of which type of information is sought and derived from the data, the information is communicated to market participants and other interested parties, including, for example, third parties who would not ordinarily have ready access to such information about the commodities, as indicated by block 122 in FIG. 3. It is contemplated and preferred that such communication to interested parties could be achieved through electronic mail, data file delivery, mobile application delivery, and/or through export of the data to an access-controlled Internet web site, which interested parties can access through a common Internet browser program, such as Google Chrome. Of course, communication of information and data to third-party market participants may also be accomplished through a wide variety of other known communications media without departing from the spirit and scope of the present invention.

Furthermore, normal activity patterns can be identified from the data, as indicated by block 130 in FIG. 3, and then stored in a database 134, as indicated by block 132 in FIG. 3. Thereafter, as subsequent information about the train and/or the commodity is derived, deviations from the normal activity patterns can also be detected, as indicated by decision 140 in FIG. 3, with alerts then being transmitted to market participants and other interested parties to notify them of such deviations from normal activity patterns, as indicated by block 142 in FIG. 3.

Figure 4:
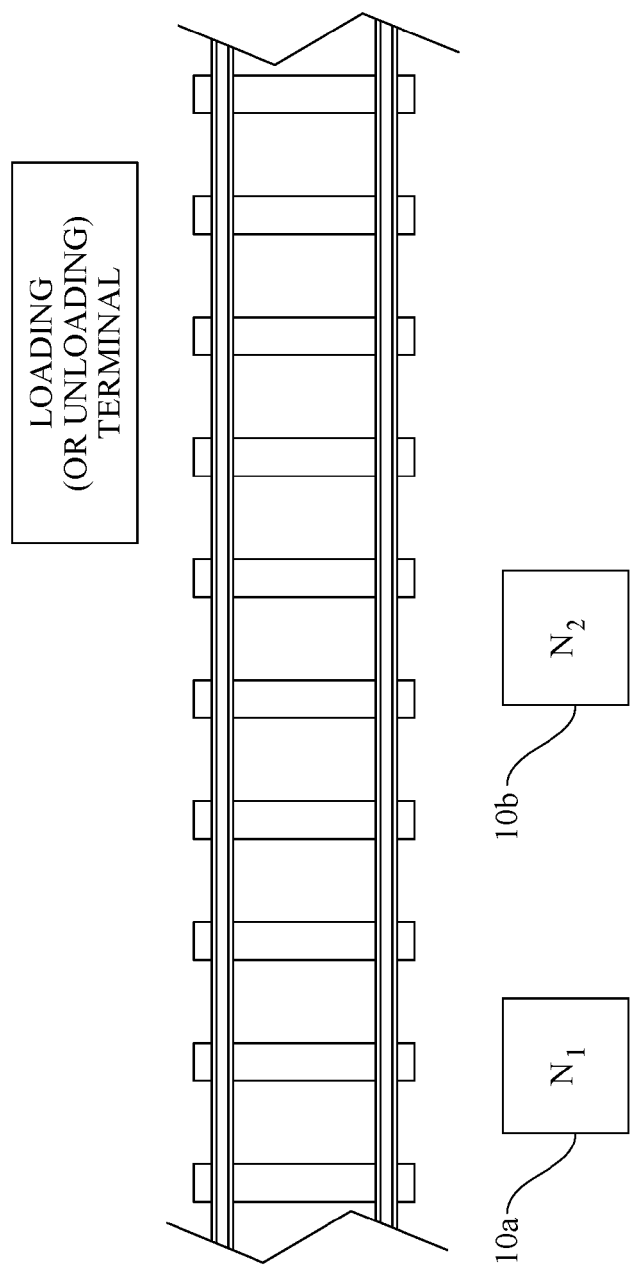
FIG. 4 is a schematic view that illustrates the positioning of two monitoring devices in range of a rail line of interest.
Figure 5:
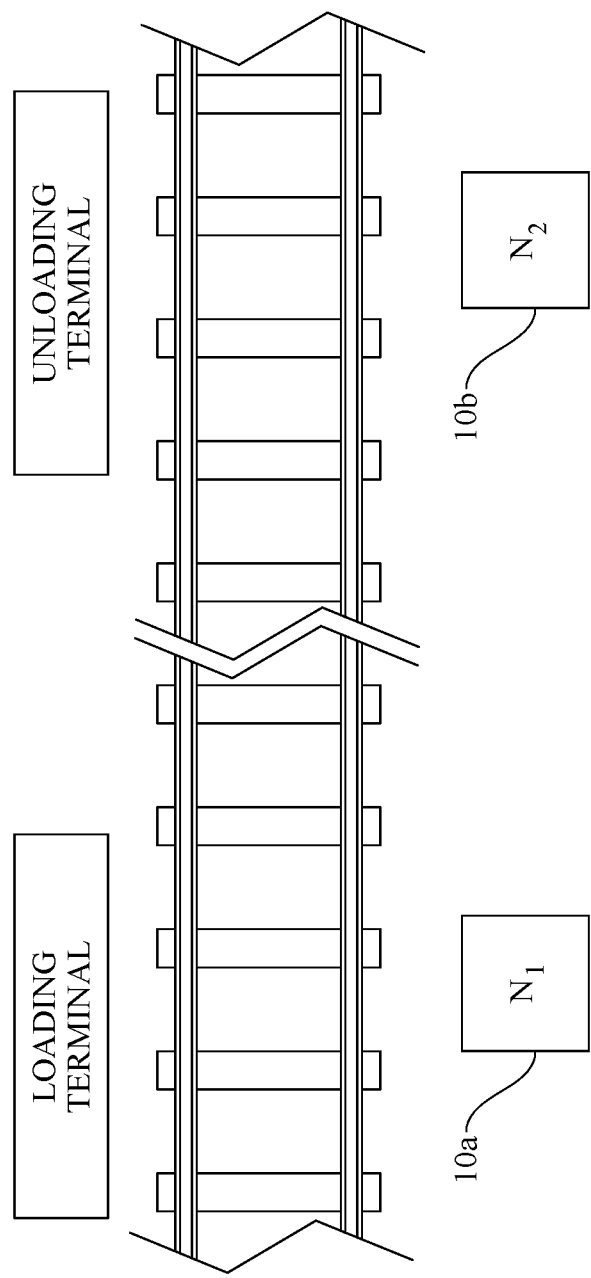
FIG. 5 is another schematic view that illustrates the positioning of two monitoring devices in range of a rail line of interest.

In another exemplary implementation, at least two monitoring devices 10a, 10b are positioned in range of a rail line of interest and are designated as a first node ($N_1$) and a second node ($N_2$) in a rail transport network, and the monitoring devices 10a, 10b thus can monitor rail transport between the two nodes, $N_1$ and $N_2$. Again, the only consideration with respect to the distance from the rail line of interest is that the monitoring devices 10a, 10b must each be close enough to receive radio signals from one or more communication systems from a train travelling on the rail line or from devices installed on the track or trackside, whether passively or by actively interrogating such devices. For example, as shown in FIG. 4, these monitoring devices 10a, 10b may be positioned in sequence along a rail line that leads to or from a loading or unloading terminal for a commodity. For another example, as shown in FIG. 5, these monitoring devices 10a, 10b may be positioned at a loading terminal and an associated unloading terminal, where a commodity is loaded at a terminal (at $N_1$) and is transported and subsequently unloaded at a receiving terminal (at $N_2$). Once a radio signal is received by the radio receiver 12 of one of the monitoring devices 10a, 10b, it is again demodulated, and the data stream can be decoded to find an identification number.

Now, assuming that the same identification number (which again is unique to a particular transmitting device on a train) is identified at both nodes, $N_1$ and $N_2$, there is a set of signal times, each representative of a discrete time that the radio signal containing the identification number was received and identified by the radio receiver 12 of each of the monitoring devices 10a, 10b:

$$t_0, t_1 \ldots t_n, t_{n+1} \qquad (9)$$

With this data, the radio signals can then be placed in sequential order, with a notation as to which node received the radio signal. Table B is a representative table of data illustrating this concept, where $N_1$ is a node (monitoring device 10a) in range of a first terminal. $N_2$ is a node (monitoring device 10b) positioned in range of a second terminal which receives the commodity that was loaded onto the train at the first terminal. The second monitoring device 10b starts to receive radio signals from the train when it comes into range of the monitoring device 10b located at $N_2$, following a 3-hour transit from $N_1$ at 4:00:00. The train then stays at the terminal ($N_2$) for one hour, leaving at 5:00:00 and arriving back at terminal ($N_1$) at 8:00:00.

TABLE B

| Number of Signals Received, n | Signal receive time, $t_n$ (hr:mm:ss) | Inter-signal delay time, $\Delta t_n = t_{n+1} - t_n$ (hr:mm:ss) | Node at which signal is received, $N_1$ or $N_2$ | Visits at Node N, $k_N$ | Node Arrival/Departure at $N_1$ | Node Arrival/Departure at $N_2$ |
|---|---|---|---|---|---|---|
| 0 | 00:00:00 | 00:00:10 | $N_1$ | | Arrival Time = 00:00:00 | |
| 1 | 00:00:10 | 00:00:10 | $N_1$ | | | |
| 2 | 00:00:20 | 00:00:10 | $N_1$ | | | |
| 3 | 00:00:30 | 00:00:10 | $N_1$ | | | |
| ... | ... | ... | | | | |
| 360 | 1:00:00 | 3:00:00 | $N_1$ | $k_{N1}$ = 1 | Departure Time = 1:00:00 | |
| 3 hour transit time from Node 1 to Node 2 | | | | | | |
| 361 | 4:00:00 | 00:00:10 | $N_2$ | $k_{N2}$ = 1 | | Arrival Time = 4:00:00 |
| 362 | 4:00:10 | 00:00:10 | $N_2$ | | | |
| 363 | 4:00:20 | 00:00:10 | $N_2$ | | | |
| 364 | 4:00:30 | 00:00:10 | $N_2$ | | | |
| ... | ... | ... | | | | |
| 721 | 5:00:00 | 3:00:00 | $N_2$ | $k_{N2}$ = 1 | | Departure Time = 5:00:00 |
| 3 hour transit time from Node 2 to Node 1 | | | | | | |
| 722 | 8:00:00 | | $N_1$ | $k_{N1}$ = 2 | Arrival Time = | |

TABLE B-continued

| Number of Signals Received, n | Signal receive time, $t_n$ (hr:mm:ss) | Inter-signal delay time, $\Delta t_n = t_{n+1} - t_n$ (hr:mm:ss) | Node at which signal is received, $N_1$ or $N_2$ | Visits at Node N, $k_N$ | Node Arrival/ Departure at $N_1$ | Node Arrival/ Departure at $N_2$ |
|---|---|---|---|---|---|---|
| | | | | | | 8:00:00 |

When there is a change with respect to the node at which the radio signal is received, such a change is representative of a change in positioning of the train, and, in this example, is indicative of a trip between two terminals associated with unloading or loading a commodity. In other words, the signal receive times can be filtered to determine the arrival and departure times for each trip, k, of a particular train from a loading terminal to an unloading terminal or from an unloading terminal to a loading terminal. With this information, transit time for a trip can also be calculated as follows:

$$t_{transit} = t_{arrival,N2} - t_{departure,N1} \qquad (10)$$

Of course, various other information can be also derived from the arrival and departure data, including, for example: the rates of arrivals and/or departures over certain time periods; average travel times between the two nodes; and the time of day of arrivals and/or departures. Again, once certain normal activity patterns are identified, deviations from the normal activity patterns can also be detected, with alerts then being transmitted to market participants and other interested parties to notify them of such deviations from normal activity patterns.

In other exemplary implementations, networks of monitoring devices, with each monitoring device serving as a node in one or more networks, are established to monitor rail lines of interest, which could lead to additional information, including, for example: operational status and activity levels relative to other nodes; abnormal commodity movements in the network(s); and delays or bottlenecks in a network.

As a further refinement, certain nodes on a rail network serve as interconnections or junctions between different track or rail owners. In some cases, transmitting devices or locomotives are switched at these nodes. By monitoring the train activity over time, and noting specific train arrivals and departure patterns, these device or locomotive switches can be inferred. Hence, a unique commodity or train can be tracked from loading or unloading terminals (or nodes) to corresponding unloading or loading terminals (or nodes) even if one or more devices are used during the trip.

As a further refinement, other data could also be decoded from the data stream from a radio signal to identify other relevant information about a particular train. For example, whenever cars are added to a train, the air brake line must be recharged. The air brake line (or pipe), which runs the entire length of the train, must remain pressurized in order to keep the brakes of each car disengaged. Railroads often disseminate manuals containing regulations on standard brake pressures, as well as the minimum and maximum charging times for different lengths of trains. For instance, one such manual is published by Burlington Northern Santa Fe (BNSF) Railroad as "Air Brake and Train Handling Rules, No. 5" (Apr. 7, 2010). Data about the brake line pressure is often available in the data stream. Thus, the length of time it takes to charge the brake line from 0 psi to the standard psi (typically 90 psi) can be calculated. Using a look-up table or database, that length of time can be correlated to a train length, and the length of the brake line can be approximated. Furthermore, the length of a typical car is typically known or can be readily estimated. Therefore, the length of a train (i.e., the number of cars) can be approximated by dividing the length of the brake line length by the length of one car.

For further illustration, Table C below includes a table of sample data for a train (Train ID 59) decoded from radio signals transmitted to two locomotives (Addresses 5731 and 23415) of that train. Included in this sample data is the status of the throttle (or power)—IDLE, N1, or N2. Based on this data, it can be discerned that, at 13:56:39, the train began moving. In some embodiments, such movement is further verified and confirmed by photographic imagery of the train.

TABLE C

| Time | Address | Train ID | Power |
|---|---|---|---|
| 13:56:35 | 5731 | 59 | IDLE |
| 13:56:37 | 23415 | 59 | IDLE |
| 13:56:38 | 23415 | 59 | IDLE |
| 13:56:38 | 5731 | 59 | IDLE |
| 13:56:39 | 23415 | 59 | N1 |
| 13:56:39 | 5731 | 59 | N1 |
| 13:56:53 | 23415 | 59 | N1 |
| 13:56:53 | 5731 | 59 | N1 |
| 13:56:54 | 23415 | 59 | N2 |
| 13:56:54 | 5731 | 59 | N2 |
| 13:57:24 | 23415 | 59 | N1 |
| 13:57:24 | 5731 | 59 | N1 |
| 13:57:30 | 23415 | 59 | N1 |
| 13:57:30 | 5731 | 59 | N1 |
| 13:57:56 | 23415 | 59 | N1 |
| 13:57:56 | 5731 | 59 | N1 |
| 13:59:09 | 23415 | 59 | N2 |
| 13:59:09 | 5731 | 59 | N2 |
| 14:03:25 | 23415 | 59 | IDLE |
| 14:03:25 | 5731 | 59 | IDLE |
| 14:04:05 | 5731 | 59 | IDLE |
| 14:04:25 | 5731 | 59 | IDLE |

Figure 6:
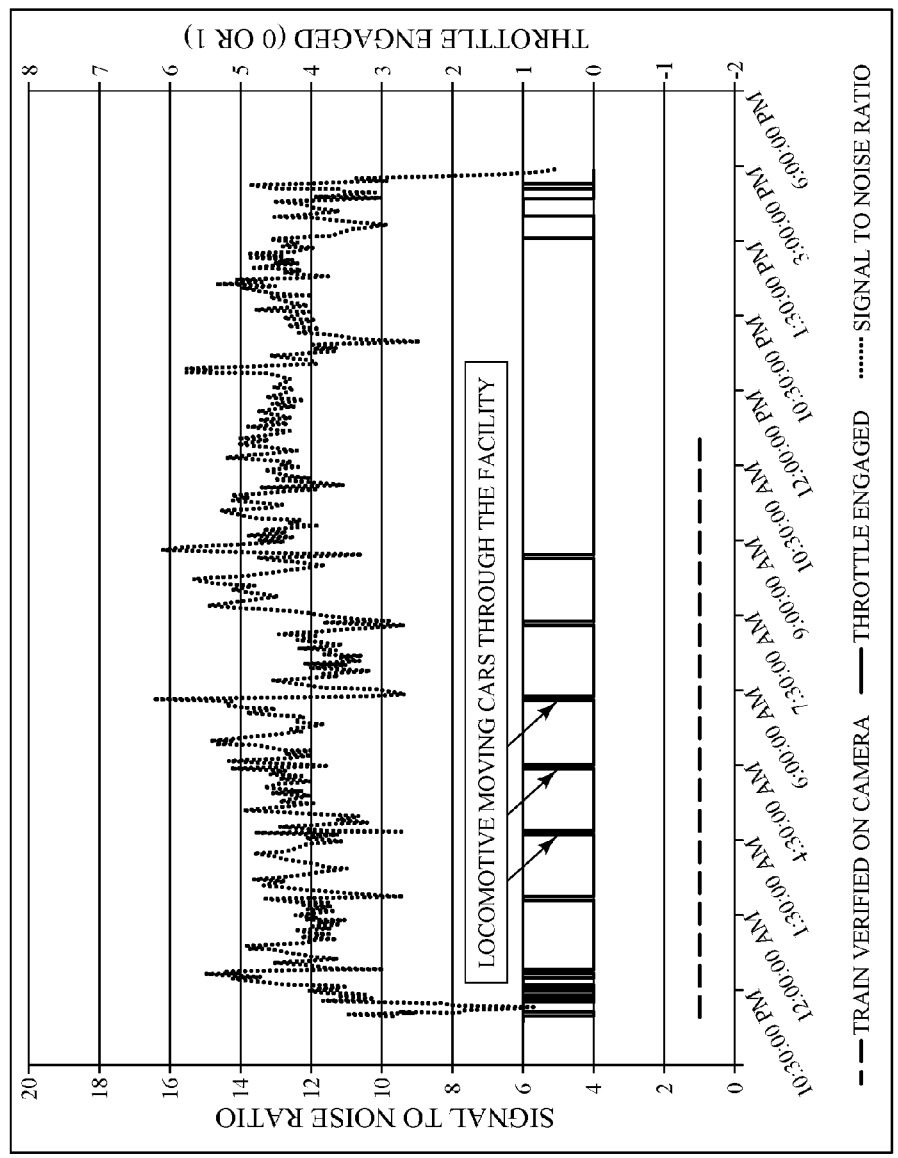
FIG. 6 is a chart that shows the measured signal-to-noise ratio and throttle status while a train is at a loading or unloading terminal.

For another example, some trains load a commodity using a batch system, where several cars are loaded at one time. The train will pull batches of cars through the loading terminal. Data on the throttle position and speed are often available in the data stream. The number of cars in the train can be approximated by counting the number of times it moves through the loading terminal. For further illustration, FIG. 6 is a chart that shows the measured signal-to-noise ratio and throttle status while a train is at a loading or unloading terminal. As shown, the status of the throttle provides an indication of movement of batches of cars through the loading or unloading terminal. Indeed, the consistent time period between respective engagements of the throttle is further confirmation that a batch loading or unloading process is underway. And, the signal-to-noise ratio provides even further confirmation of movement of the train. Finally, in FIG. 6, there is also an indication of when the train is within range of a camera, so that photographic imagery can be used to verify the presence of the train.

Furthermore, information regarding the number of cars that can be loaded or unloaded at one time within a terminal can be gathered from publicly available sources, such as company presentations, financial filings, or websites. This is stated as the number of loading or unloading pumps in the terminal. If $N_1$ represents this number, then the number of times that the train stops inside the terminal, which can be found in the data stream and also confirmed via photographic imagery, can be represented by $N_2$. Therefore, the number of train cars loaded or unloaded on a given visit to the terminal is $N_1 \times N_2$.

As a further refinement, if two monitoring devices are positioned along the same rail line at a predetermined distance from one another, measurements of the signal-to-noise ratio of the radio signals received at each monitoring device, along with triangulation techniques, can be used to approximate the direction of travel and speed of a particular train as well as the location of a train (or the location of a device installed on the track or trackside) if it is stationary at a point along the track or at a terminal.

In the case where there are two or more different terminals or points of interest within the radio range of a monitoring device, multiple monitoring devices may be arranged in an optimal spatial distribution, and directional radio antennae or spatial arrays of antennae may be deployed in order to focus the radiodetection on a specific terminal (or node) and exclude radiofrequency signals from another terminal (or node) in order to pinpoint where specific trains are in a given detection area. Satellite and/or other imagery may be taken of the rail line, rail facility, or terminal of interest in order to determine the number of trains and associated cars that move into and out of a rail region of interest and to define the patterns of movement on different rail lines. This data can then serve to design the required locations for monitoring devices to optimize signal reception and signal targeting methods.

As a further refinement, pricing information about a commodity could be used in combination with data and information derived from monitoring rail operations in accordance with the present invention in order to determine: (a) how abnormal commodity movements affect and/or predict price; (b) how price changes affect commodity flows on a network; and (c) commodity flow rates from certain geographic regions.

As a further refinement, data and information derived from monitoring rail operations in accordance with the present invention could be used in combination with other data sets in order to better approximate the volume of a commodity loaded onto or unloaded from a train.

For example, commonly owned U.S. Pat. No. 8,842,874 is entitled "Method and System for Determining an Amount of a Liquid Energy Commodity Stored in a Particular Location." U.S. Pat. No. 8,842,874, which is incorporated herein by reference, describes and claims a method for determining an amount of a liquid energy commodity stored in a particular location, including, inter alia: (i) storing volume capacity information associated with each tank at the particular location in a database; (ii) periodically conducting an inspection of each tank at the particular location from a remote vantage point and without direct access to each tank, including collecting one or more images of each tank; (iii) transmitting the collected images of each tank to a central processing facility; (iv) analyzing the collected images of each tank to determine a liquid level for each tank; and (v) calculating the amount of the liquid energy commodity in each tank based on the determined liquid level and the volume capacity information retrieved from the database. Tanks associated with the loading or unloading of identified trains could be evaluated in this manner to determine (or confirm) the volume of the commodity loaded onto or unloaded from the train. In short, if a particular train is at a loading or unloading terminal, any change in volume in the tank while the train is present can be presumed to be equivalent to the volume loaded onto or unloaded from the train. Alternatively, if possible, visual or infrared images of the tanker cars on the trains could be collected and analyzed to obtain information about the liquid level in each tanker car.

For another example, commonly owned U.S. Pat. No. 8,717,434 is entitled "Method and System for Collecting and Analyzing Operational Information from a Network of Components Associated with a Liquid Energy Commodity." U.S. Pat. No. 8,717,434, which is incorporated herein by reference, thus describes the monitoring of one or more power lines supplying electric power to certain pumping stations along a selected pipeline in order to determine flow through and between pumping stations. By similarly monitoring pumps associated with a tank at a loading or unloading terminal, the flow rate of a commodity from the tank to or from a particular train at the loading or unloading terminal can be approximated.

Figure 7:
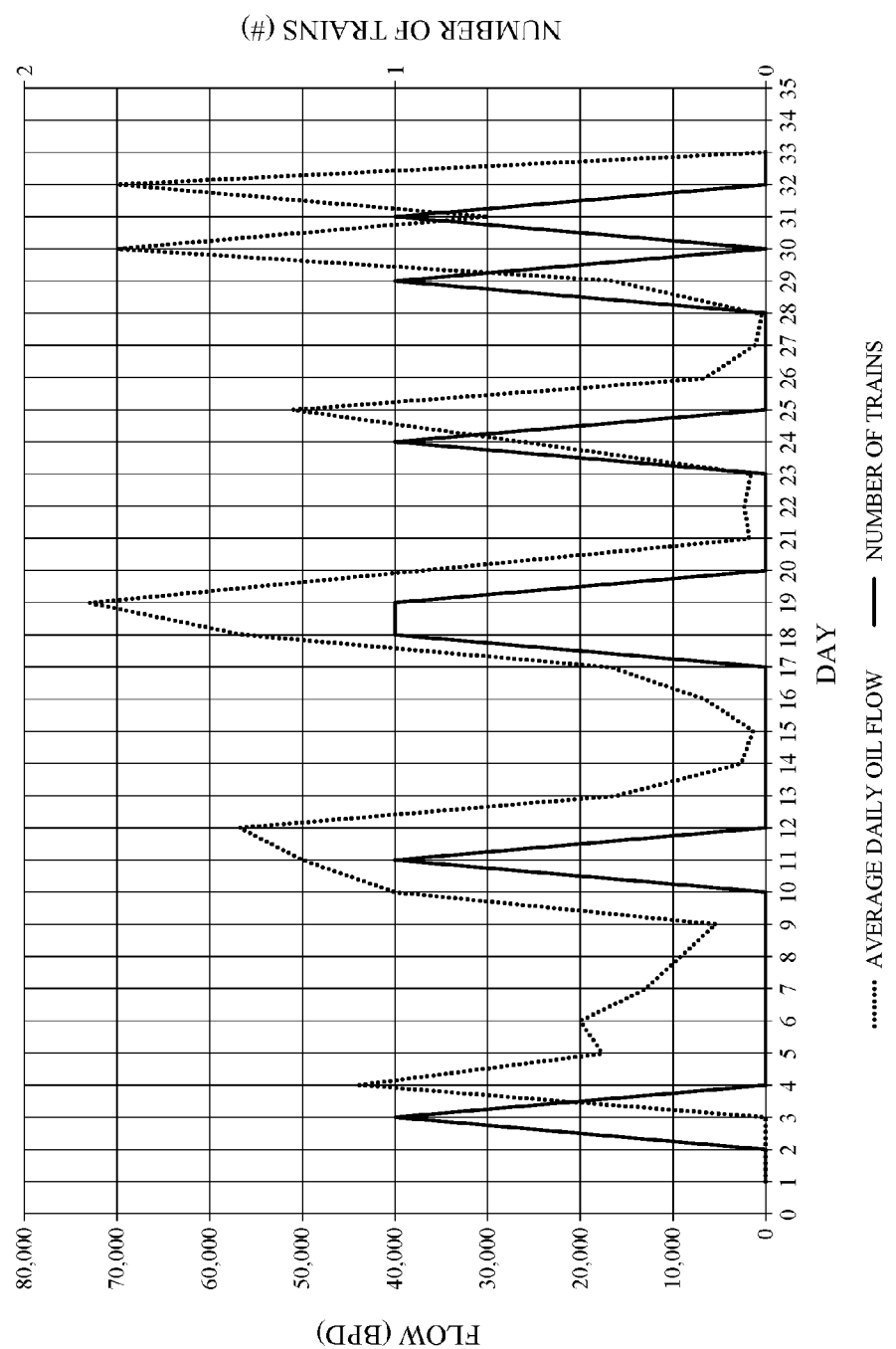
FIG. 7 is a chart that shows an example of the correlation between oil flow on a pipeline associated with a rail terminal derived from measuring electric power consumption at the terminal and then plotting that data against the arrivals and departure of trains unloading oil at the terminal.

For further illustration, FIG. 7 is a chart that shows an example of the correlation between oil flow on a pipeline associated with a rail terminal derived from measuring electric power consumption at the terminal and then plotting that data against the arrivals and departure of trains unloading oil at the terminal. The oil unloaded by the train is pumped into local tanks and, from there, to a remote oil storage location.

For yet another example, and as briefly mentioned above with reference to FIG. 6, cameras could be used to collect information about the presence of a train, e.g., whether and when it is at a loading or unloading terminal. Such cameras could be ground-based, aerial, or satellite cameras, capturing signals in the visual, infrared, or ultraviolet spectra. Furthermore, images from such cameras could be analyzed with certain optical character recognition (OCR) or other image processing tools in order to extract data from such images, including, for example: rail car identification numbers, marks, and barcodes; ownership markings; Department of Transportation (DOT) markings; hazardous material signage or markings; dimensions; numbers of locomotives or cars; types of locomotives or cars; positioning of locomotives or cars; weight capacity; and car loaded or empty status. Such data or combinations of such data may assist in a determination or confirmation as to what is stored in each car. Once such data is extracted and collected, a database or other central repository containing additional data about the locomotives and the cars could also be referenced to access more detailed data about such things as the location of the train over time, the operational status of the cars, and the destination.

Similarly, rather than a camera, other active interrogation systems, including laser scanning systems, LIDAR sensing systems, and radio-frequency identification (RFID) systems, could be used to capture and extract data from and about a particular train. Again, once such data is extracted and collected, a database or other central repository containing additional data about the locomotives and the cars could also be referenced to access more detailed data about such things as the location of the train over time, the operational status of the cars, and the destination. As another example, data from other sensor systems may serve to inform when a train is present in the vicinity so that the identifying radio signals may be more definitively tied to a specific appearance of a train. Such systems may include acoustic, vibration, and/or optical sensors, for example, placed near enough to the railroad tracks to detect the presence of the train travelling on the tracks. Furthermore, these sensors could be used to trigger a camera or other local or remote visualization device to capture an image of the train. Additionally, information derived from the sensor systems could be used to approximate the numbers of cars on the train or the speed, direction, size, type, and/or other information about the train itself.

As a further refinement, data and information derived from monitoring rail operations in accordance with the present invention could be used in combination with publically available data sets in order to better approximate the volume of a commodity loaded onto or unloaded from a train. Examples of such publically available data include freight rates, periodic terminal export data, state and regulatory data, and/or similar information on commodity transport in a rail network. Even though some of this data may be delayed (and not available in real-time), it can still be used to calibrate and develop models.

As a further refinement, data and information derived from monitoring rail operations in accordance with the present invention could be used in combination with shipping vessel data in order to better approximate the volume of a commodity loaded onto or unloaded from a train. Such shipping vessel data can be derived from a network of automatic identification system (AIS) receivers. Examples of such data include the position, movement, contents, speed, and/or similar information about shipping vessels. By monitoring the movement of said shipping vessels to and from a terminal where a train is loading or unloading a commodity of interest, information about the volumes or types of commodities being transferred could thus be derived.

One of ordinary skill in the art will recognize that additional embodiments and implementations are also possible without departing from the teachings of the present invention. This detailed description, and particularly the specific details of the exemplary embodiments and implementations disclosed therein, is given primarily for clarity of understanding, and no unnecessary limitations are to be understood therefrom, for modifications will become obvious to those skilled in the art upon reading this disclosure and may be made without departing from the spirit or scope of the invention.

What is claimed is:

1. A method for monitoring rail operations, comprising the steps of:
    positioning a monitoring device, said monitoring device including a radio receiver configured to receive radio signals from an existing communications system for trains that are in range of the monitoring device;
    using the radio receiver to receive radio signals from the existing communications system;
    demodulating each received radio signal into a data stream;
    decoding the data stream to find an identification number, which identifies a particular train;
    analyzing the received radio signals associated with the particular train to identify a position of the particular train at a given time; and
    reporting information about the position of the particular train at the given time to an interested party;
    wherein the existing communications system is one of the following: (i) a radio communication link of a distributed power system for a train; (ii) an end-of-train protocol for communications between a rear car and a locomotive cab of a train; (iii) an advanced train control system for communications between track monitoring locations and a train; or (iv) a communications link of a positive train control system for a train.

2. The method as recited in claim 1, wherein the position of the particular train is identified relative to a terminal, and the step of reporting information about the position of the particular train includes information about an arrival and/or a departure time of the particular train with respect to the terminal.

3. A method for monitoring rail operations, comprising the steps of:
    positioning a monitoring device, said monitoring device including a radio receiver configured to receive radio signals from trains, tracks, or trackside locations in range of the monitoring device;
    using the radio receiver to receive radio signals;
    demodulating each received radio signal into a data stream;
    decoding the data stream to find an identification number, which identifies a particular train;
    analyzing the received radio signals associated with the particular train to (i) identify a position of the particular train relative to a terminal at a given time, (ii) determine an arrival time or a departure time of the particular train with respect to the terminal, and (iii) determine a time period that the particular train stayed at the terminal; and
    reporting information about the position of the particular train at the given time to an interested party, including information about the arrival time and/or the departure time of the particular train with respect to the terminal.

4. The method as recited in claim 3, and further comprising the step of:
    applying a filter to the determined time period that the particular train stayed at the terminal.

5. The method as recited in claim 2, and further comprising the step of reporting one or more of the following: rates of arrivals and/or departures of identified trains over certain time periods; average visit times at the terminal for identified trains; and times of day of arrivals and/or departures of identified trains at the terminal.

6. A method for monitoring rail operations, comprising the steps of:
    positioning a monitoring device, said monitoring device including a radio receiver configured to receive radio signals from trains, tracks, or trackside locations in range of the monitoring device;
    using the radio receiver to receive radio signals;
    demodulating each received radio signal into a data stream;
    decoding the data stream to find an identification number, which identifies a particular train;
    decoding the data stream to find and extract throttle status data for the particular train;
    analyzing the received radio signals associated with the particular train to identify a position of the particular train relative to a terminal at a given time;
    using the throttle status data to confirm movement of the particular train relative to the terminal; and
    reporting information about the position of the particular train at the given time to an interested party, including information about an arrival time and/or a departure time of the particular train with respect to the terminal.

7. A method for monitoring rail operations, comprising the steps of:
    positioning a monitoring device, said monitoring device including a radio receiver configured to receive radio signals from trains, tracks, or trackside locations in range of the monitoring device;
    using the radio receiver to receive radio signals;
    demodulating each received radio signal into a data stream;

decoding the data stream to find an identification number, which identifies a particular train;
analyzing each received radio signal associated with the particular train to identify a position of the particular train at a given time;
identifying normal activity patterns for the particular train from the received radio signals;
storing the identified normal activity patterns in a database;
analyzing subsequently received radio signals to detect deviations from the identified normal activity patterns for the particular train as stored in the database; and
transmitting an alert to an interested party when such a deviation is detected.

8. A method for monitoring rail operations, comprising the steps of:
positioning a monitoring device, said monitoring device including a radio receiver configured to receive radio signals from trains, tracks, or trackside locations in range of the monitoring device;
using the radio receiver to receive radio signals;
demodulating each received radio signal into a data stream;
decoding the data stream to find an identification number, which identifies a particular train;
analyzing the received radio signals associated with the particular train to identify a position of the particular train at a given time;
using a camera to capture an image of the particular train;
extracting data about the particular train from the image;
using the data to confirm information about the position of the particular train; and
reporting information about the position of the particular train at the given time to an interested party.

9. A method for monitoring rail operations, comprising the steps of:
positioning a monitoring device, said monitoring device including a radio receiver configured to receive radio signals from trains, tracks, or trackside locations in range of the monitoring device;
using the radio receiver to receive radio signals;
demodulating each received radio signal into a data stream;
decoding the data stream to find an identification number, which identifies a particular train;
analyzing the received radio signals associated with the particular train to identify a position of the particular train at a given time;
using an active interrogation system to capture and extract data from and about the particular train;
using the data to confirm information about the position of the particular train; and
reporting information about the position of the particular train at the given time to an interested party.

* * * * *